Dec. 17, 1929.    L. H. CORMIER    1,740,072
MICROMETER SINE PROTRACTOR
Filed Dec. 22, 1927
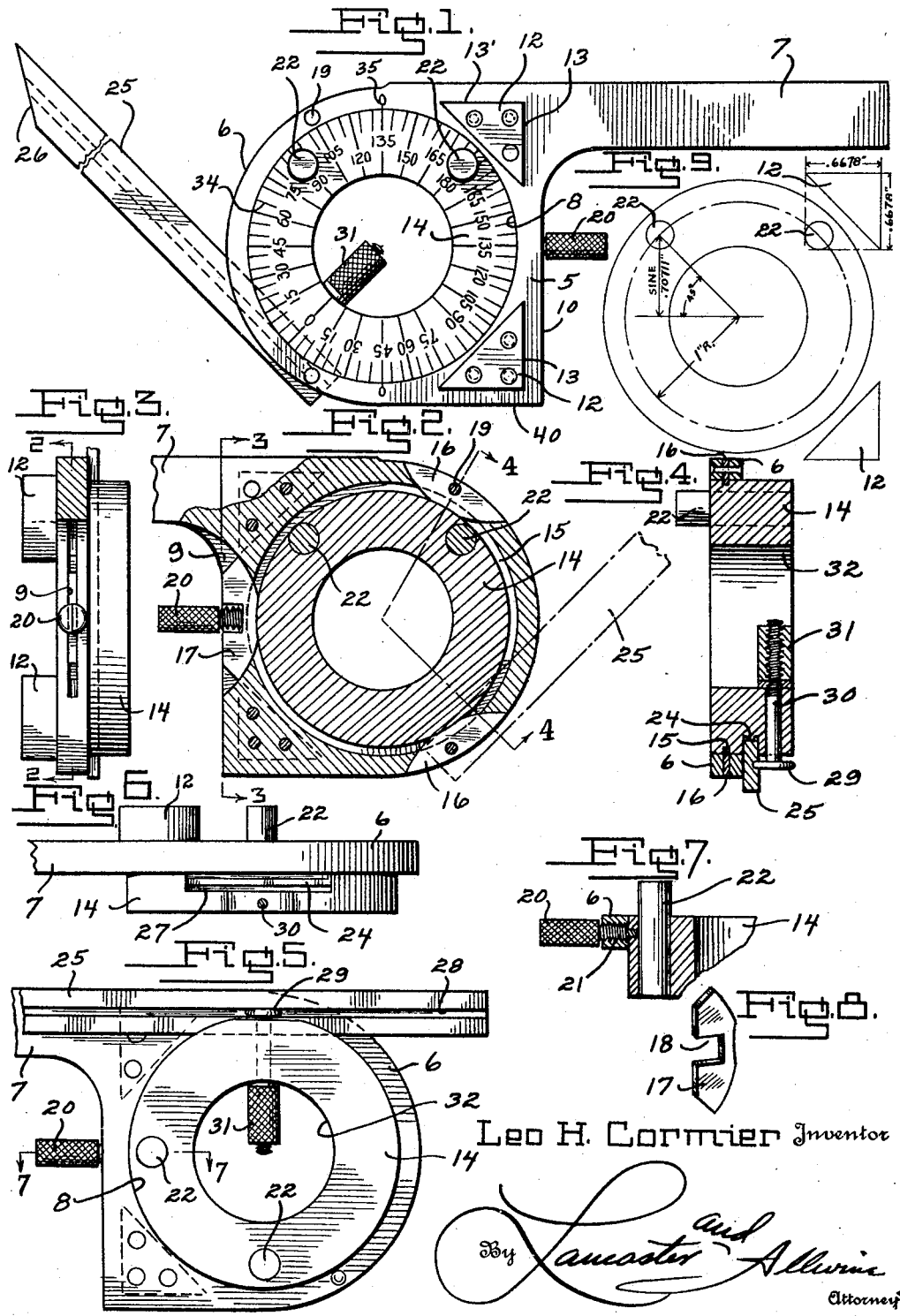

Patented Dec. 17, 1929

1,740,072

UNITED STATES PATENT OFFICE

LEO HENRY CORMIER, OF DETROIT, MICHIGAN

MICROMETER SINE PROTRACTOR

Application filed December 22, 1927. Serial No. 241,902.

The present invention relates to improvements in bevel protractors especially well adapted for use in checking up angles accurately as to degrees and minutes of a circle by the employment of a one inch or one to two inch micrometer in connection with the protractor.

The primary object of the present invention is to provide a protractor construction embodying features whereby the blade may be accurately set to within one minute of a degree or within .0015" for an angle six inches long.

With the present type of protractor embodying vernier adjustments, a positive adjustment of an angle is not practical because of the difficulty encountered in endeavoring to adjust the blade to within five minutes of a degree, with the result that the angle of the blade will be inaccurately set to approximately .008" or .009" for an angle six inches long. It is therefore a further object of the invention to provide a protractor construction embodying features whereby the protractor can be accurately set to within one minute of a degree by a micrometer reading.

A further object of the invention is to provide a protractor embodying features whereby the blade can be accurately set to any determined angle in a manner much quicker than with the present type of protractor embodying vernier adjustments.

A further object of the invention is to provide a protractor embodying gauge members for the obtaining of a micrometer reading for determining the angle of the blades as to degrees and minutes.

A still further object of the invention is to provide a device of this character which will permit of its accuracy being checked up, and one wherein the angle blade is reversible and longitudinally adjustable with respect to the body portion of the protractor without changing the angle of the blade with respect to the body portion of the protractor.

A still further object of the invention is to provide a device of this character which is of extremely simple and durable construction, and which device may be constructed on a small scale and yet permit of accurate checking up of angles to within one minute of a degree.

Other objects and advantages of the invention will be apparent during the course of the following detailed description, taken in connection with the accompanying drawing, forming a part of this specification, and in which drawing, Figure 1 is a face plan view of a micrometer sine protractor constructed in accordance with this invention.

Figure 2 is a sectional view taken substantially on the line 2—2 of Figure 3 and illustrating the manner in which the graduated ring is mounted in the body portion of the protractor.

Figure 3 is an edge view of the protractor and showing the arm in section, the view being one taken on the line 3—3 of Figure 2.

Figure 4 is a section taken substantially on the line 4—4 of Figure 2.

Figure 5 is a fragmentary plan view of the rear side of the protractor.

Figure 6 is a fragmentary edge elevation of the protractor and showing the guide groove for mounting of the adjustable angle blade.

Figure 7 is a fragmentary section on the line 7—7 of Figure 5.

Figure 8 is a perspective view of the locking key for securing the graduated ring against rotation in the body portion of the protractor.

Figure 9 is a view illustrating the manner in which the micrometer measurements are determined.

In the drawings, and wherein similar reference characters designate corresponding parts throughout the several views, the improved micrometer sine protractor has been shown as embodying a main body portion 5 embodying a head portion 6 and an arm 7 extending from one edge of the head 6 and forming a straight edge. The head portion 6 is provided with a circular shaped opening 8, and also with a series of arcuately formed slots 9 which are arranged at 120° apart about the circular opening 8. These slots or pockets 9 are preferably arranged as shown in Figure 2 with one of the slots being formed in the straight side edge 10 of the head 6 directly below the arm 7, and form communicating openings between the peripheral edge of the head and the circular opening 8. Secured in any preferred manner to the face of the body portion 5 at points spaced 90° apart about the circular opening 8 is a pair of triangular shaped gauge blocks 12. As will be observed in Figure 1, these gauge blocks 12 are mounted so that their gauge faces 13 are arranged in a like plane and with the gauge faces 13' extending in parallel alignment and parallel with the longitudinal axis of the arm 7.

Mounted to rotate in the circular opening 8 of the portion 6 is a gauge ring 14 being of considerably greater thickness than the thickness of the body portion 5, and which gauge ring is provided adjacent its face side with a continuous circumferentially extending groove 15 for aligning with the slots 9 when the face side of the ring aligns with the face side of the head 6. Fitting within two of the slots or pockets 9 are retaining keys 16, while fitting in the third pocket beneath the arm 7 is a locking key 17 having a recess 18 opening at its rear edge. These retaining and locking keys 16 and 17 respectively are so formed and mounted in the slots 9 as to have portions thereof projecting inwardly of the circular opening 8 and fit into the annular groove 15 of the gauge ring 14 in a manner whereby the ring is free to rotate in the head 6. The keys 16 may be held in position as by suitable rivets 19, while the key 17 has associated therewith a knurled set screw 20 which acts to move the key 17 into slight binding contact with the base of the annular groove 15 for locking the gauge ring in its adjusted position in the head 6. By observing Figures 3 and 7 it will be seen that the slot 9 is provided intermediate its ends with a threaded portion 21 for threaded reception of the threaded inner end of the set screw 20 which projects into the recess 18 provided in the locking key 17. By observing Figure 2 it will be seen that when the set screw 20 is threaded inwardly that the locking key 17 will create a binding action upon the ring 14 for retaining the ring against further rotation in the head 6.

Carried by the ring 14 and spaced at points 90° apart and at equal distances from the axial center of the ring, is a pair of cylindrical shaped gauge pins or projections 22 which project from the face side of the ring and co-act with the gauge blocks 12 for allowing a micrometer reading to be obtained between the gauge pins and gauge faces of the blocks. These gauge pins or projections 22 are of equal diameters where they project past the face side of the gauge ring, and in the example shown are in the form of cylindrical shaped pins secured in the ring 14 in any preferred manner.

Provided in the circumferential face of the gauge ring 14 is a tangentially formed guide groove 24 for slidably receiving an angle blade 25 having a beveled end 26. The bottom of the groove 24 is preferably provided with relief grooves 27 for insuring flat seating of one edge of the angle blade 25 in the bottom of the groove. The angle blade 25 is provided with a longitudinally extending groove 28 for receiving the head 29 of a retaining bolt 30 which extends radially through the gauge ring and has a threaded inner end for threaded reception of a knurled nut 31. The threaded shank portion of the retaining bolt extends into the circular opening 32 formed in the ring 14, and by observing Figure 4 it will be seen that upon tightening of the nut 31 that the head 29 by engaging in the slot 28 will draw the angle blade 25 into binding contact with the flat bottom surface of the guide groove 24 for retaining the angle blade in an adjusted position tangentially of the gauge ring. When desiring to adjust the angle blade longitudinally it is merely necessary to loosen the nut 31 and then shift the blade longitudinally to the desired extent and then again tighten the nut 31.

The face side of the gauge ring 14 is preferably provided with graduations 34 which may co-act with gauge marks 35 provided on the head 6 for aiding in checking up angles by the micrometer readings obtained between the gauge pins 22 and gauge blocks 12. These graduations 34 may also be of use in the rough checking up of angles where it is not essential that the angle be determined in degrees and minutes.

As to the manner in which the protractor is used for determining the degrees and minutes of an angle, an edge of the angle blade 25 is preferably used in conjunction with one straight edge of the arm 7, or may, if such becomes necessary be used in connection with the straight edge 40. By referring to Figure 9 it will be seen how the micrometer measurements are determined by obtaining measurements between the gauge faces of the gauge blocks 12 and the circumferential face of the gauge pins 22. After the blade 25 has been set to the proper angle the set screw 20 may be turned slightly for clamping the gauge ring 14 against rotation in the head 6 and thus the gauge pins are secured in position for obtaining the measurement in fractions of an inch between the gauge face of the blocks and the circumferential face of the pin. The reading of the micrometer is then taken and by referring to a chart or table, the exact angle both as to degrees and minutes will be accurately obtained.

Here follows a chart or table showing a few of the micrometer measurements:

| Micrometer measurements | | | | |
|---|---|---|---|---|
| | 0° | 1.375″ | 180° | |
| 75° | 15° | 1.1161″ | 165° | 105° |
| 60° | 30° | .875″ | 150° | 120° |
| | 45° | .6678″ | 135° | |
| | 1° | 1.3575″ | | |
| | 1° 1′ | 1.3572″ | | |
| | 1° 2′ | 1.3569″ | | |
| | 1° 3′ | 1.3566″ | | |
| | 1° 4′ | 1.3563″ | | |
| | 1° 5′ | 1.356″ | | |

It will be seen from the foregoing chart that there is a difference of .0015″ from 1° to 1° 5′ and a difference of .0003″ for every minute of a degree or approximately .00025″. It will therefore be seen how the blade 25 of the protractor can be accurately set to within one minute by use of the micrometer, and by reason of the fact that the gauge ring 14 is so held as by the set screw 20 within the circular opening 8, the gauge pins 22 will at all times give the same micrometer measurements for any determined angle. It will also be apparent that the protractor is so formed as to permit of practically any object to be checked up for accurately determining any of its angles.

From the foregoing description it will be apparent that a novel and efficient micrometer sine protractor has been provided whereby the blade may be accurately set to within one minute of a degree or .00025″ to the inch or within .0015″ for an angle of 6″ in length. It will also be apparent that an improved micrometer sine protractor has been provided embodying features whereby the gauge members may be accurately checked up for insuring accurate micrometer measurements for any determined angle.

Changes in detail may be made to the specific form of the invention herein shown and described, without departing from the spirit of the invention or the scope of the following claims.

I claim:

1. In a protractor of the class described, a main body portion including a head and an arm providing a straight edge, a gauge ring revolubly mounted in the head with its face side flush with the face side of the head, means for adjustably retaining the ring against rotation in the head, an angle blade carried by the gauge ring, and co-acting gauge receiving projections extending from the face side of the protractor body portion and gauge ring.

2. In a protractor of the class described, a main body portion including a head and an arm providing a straight edge, a gauge member revolubly mounted in said head, means for adjustably retaining the member against rotation in the head, an angle blade carried by the gauge member, gauge receiving projections carried by the gauge member concentric with the axis thereof, and co-acting gauge receiving projections carried by the protractor body portion concentric to the axis of the gauge member.

3. In a protractor of the class described, a main body portion including a head and an arm providing a straight edge, a gauge member revolubly mounted in said head, means for adjustably retaining the member against rotation in the head, an angle blade carried by the gauge member, cylindrical shaped gauge receiving projections extending from the face side of the gauge member concentric to the axis thereof, and triangular shaped gauge receiving projections extending from the base side of the protractor body portion concentric to the axis of the gauge member.

4. In a protractor of the class described, a body portion including a head and an arm providing a straight edge, a gauge member revolubly mounted in said head, means for adjustably retaining the member against rotation in said head, an angle blade carried by the gauge member, cylindrical formed gauge receiving projections extending from the face side of the gauge member concentric to the axis thereof and arranged 90° apart, and triangular shaped gauge receiving projections extending from the face side of the protractor body portion and each having right angularly extending gauge receiving faces to be engaged by one anvil of a micrometer, the companion anvil of the micrometer to engage the cylindrical surface of one of the gauge receiving projections on the gauge member.

5. In a protractor of the class described, a body portion including a head and an arm providing a straight edge, a gauge member revolubly mounted in said head, means for adjustably retaining the member against rotation in the head, an angle blade carried by the gauge member, a pair of cylindrical shaped gauge receiving pins of like diameter carried by and projecting from the face side of the gauge member concentric to the axis thereof, and a pair of triangular shaped gauge receiving lugs fixedly carried by the protractor body portion and each having flat gauge engaging faces for co-acting with the cylindrical surfaces of said pins.

6. In a protractor of the class described, a body portion including a head and an arm providing a straight edge, a gauge ring revolubly mounted in said head, means for adjustably retaining the ring against rotation in the head, said gauge ring having a tangentially formed guide groove, an angle blade movable longitudinally in the guide groove, a retaining bolt extending radially through the gauge ring and having a head portion engageable with the angle blade, a knurled thumb nut threaded on the retaining bolt inwardly of the ring for adjustably retaining the angle blade within the guide groove, and co-acting gauge receiving projections extending from the face side of the protractor body portion and gauge member.

7. In a protractor of the class described, a body portion including a head and an arm providing a straight edge, a gauge ring revolubly mounted in the head and having an opening of true circular formation, means for adjustably retaining the ring against rotation in the head, an angle blade carried by the gauge ring, cylindrical shaped gauge receiving pins projecting from the face side of the gauge ring concentric with the axis of the circular opening into the gauge ring, and gauge receiving blocks projecting from the face side of the protractor body portion for co-acting with said pins.

8. In a protractor of the class described, a body portion including a head provided with a circular opening, a gauge ring revolubly fitting in said opening and provided with a circumferentially extending groove, key members carried by the head and extending into said groove for retaining the ring in position within the circular opening of the head, a locking key carried by the head and engageable in the groove of the gauge ring, and means for moving the locking key into engagement with the gauge ring for adjustably retaining the ring against rotation in the head.

9. In a micrometer sine protractor of the class described, a main body portion including a head provided with a circular shaped opening and slots extending from the opening to the edges of the head, a gauge ring revolubly seating in the opening and provided with a circumferentially extending groove, retaining keys secured in certain of said slots and fitting in said groove of the gauge ring for retaining the ring against lateral movement within the head, a locking key fitting in one of said slots and extending into the groove of the gauge ring, and a set screw in threaded engagement with the head and engageable with the locking key for movement of the key into holding engagement with the gauge ring for preventing rotation thereof within the head of the protractor body portion.

10. In a micrometer sine protractor, a body portion including a head provided with a circular shaped opening and an arm providing a straight edge, a gauge ring revolubly fitting in the opening in said head and provided with a circumferentially extending groove, retaining keys carried by said head and engageable in said groove for preventing lateral movement of the gauge ring within the head, a locking key fitting in said groove of the gauge ring, means engageable with the locking key for adjustably retaining the gauge ring against rotation in said head, an angle blade adjustably carried by the gauge ring, gauge receiving pins carried by the gauge ring and arranged concentric to the axis thereof, and gauge receiving blocks carried by the protractor body portion for co-acting with the pins carried by the gauge ring whereby micrometer measurements between surfaces of the blocks and pins may be obtained to act as a basis for determining the angular relation of the protractor arm and angle blade.

11. In a protractor of the class described, a main body including a head and an arm providing a straight edge, a gauge ring revolubly mounted in the head and provided on its face side with graduations for co-acting with gauge marks provided on the face side of the head, means for adjustably retaining the gauge ring against rotation in the head, an angle blade carried by the gauge ring, and co-acting sets of gauge receiving projections carried by and extended from the face side of the head and gauge ring.

12. In a protractor of the class described, a substantially flat main body portion including a head and an arm extending from one edge of the head and forming a straight edge, a gauge ring revolubly mounted in the head with its face side flush with the face side of the head, said gauge ring being of greater thickness than the head and having a tangentially formed guide groove provided in its projecting portion, means for adjustably retaining the member against rotation in the head, co-acting gauge receiving projections extending from the face sides of the head and gauge ring, an angle blade movable longitudinally in the guide groove, and means for adjustably retaining the angle blade within the guide groove.

LEO HENRY CORMIER.